United States Patent
Courbis

(10) Patent No.: US 10,337,541 B2
(45) Date of Patent: Jul. 2, 2019

(54) DEVICE FOR SECURING AN ELEMENT ON A PIPE, ASSEMBLY, INSTALLATION AND IMPLEMENTATION METHOD

(71) Applicant: Financiere de Beaumont—FBD, Romans (FR)

(72) Inventor: Hervé Courbis, Romans sur Isere (FR)

(73) Assignee: Financiere de Beaumont-FBD, Romans (FR)

( * ) Notice: Subject to any disclaimer, the term of this patent is extended or adjusted under 35 U.S.C. 154(b) by 0 days.

(21) Appl. No.: 15/821,790

(22) Filed: Nov. 23, 2017

(65) Prior Publication Data

US 2018/0142713 A1 May 24, 2018

(30) Foreign Application Priority Data

Nov. 23, 2016 (FR) ..................................... 16 61376

(51) Int. Cl.
| | |
|---|---|
| *F16L 3/137* | (2006.01) |
| *F16B 2/08* | (2006.01) |
| *F16L 3/00* | (2006.01) |
| *G12B 9/08* | (2006.01) |
| *F16B 7/04* | (2006.01) |
| *F16L 3/233* | (2006.01) |

(52) U.S. Cl.
CPC .............. *F16B 2/08* (2013.01); *F16B 7/0433* (2013.01); *F16L 3/00* (2013.01); *G12B 9/08* (2013.01); *F16L 3/137* (2013.01); *F16L 3/233* (2013.01)

(58) Field of Classification Search
USPC .................................. 248/74.3, 229.8, 230.8
See application file for complete search history.

(56) References Cited

U.S. PATENT DOCUMENTS

| 1,483,192 A | | 2/1924 | Langgons |
| 2,703,216 A | * | 3/1955 | Petersen ................. E04H 12/04 |
| | | | 248/218.4 |
| 3,164,401 A | * | 1/1965 | Fawkes ................. F16L 51/024 |
| | | | 285/229 |

(Continued)

FOREIGN PATENT DOCUMENTS

| EP | 2058575 | 5/2009 |
| FR | 2480875 | 10/1981 |

OTHER PUBLICATIONS

Rapport de Recherche Préliminaire et Opinion Ecrite [Preliminary Search Report and the Written Opinion] dated Aug. 2, 2017 From the Institut National de la Propriété Industrielle de France, INPI Re. Application No. FR 1661376. (7 Pages).

*Primary Examiner* — Alfred J Wujciak

(57) ABSTRACT

A device for securing an element on a pipe, the device comprising: a compensating member made from elastic material, and two strands that each extend between a first end secured to the compensating member and a second free end; where the strands are able, by junction of the second ends, to form a strap provided to secure the element to the pipe. The compensating member is, on the one hand, stretchable when the device is tightened around the pipe and, on the other hand, gradually shrinkable over time to keep the strap taut when the pipe shrinks. The device may be incorporated in an assembly including an element provided to be secured to the pipe with the device. The assembly may be incorporated in an installation including a pipe. In addition, a method for implementing such a device.

15 Claims, 4 Drawing Sheets

(56) References Cited

U.S. PATENT DOCUMENTS

| | | | | |
|---|---|---|---|---|
| 4,222,198 | A | * | 9/1980 | Napolitano ............ A01G 17/12 |
| | | | | 47/43 |
| 5,303,650 | A | * | 4/1994 | Wieland ................ B41F 21/104 |
| | | | | 101/409 |
| 5,573,211 | A | * | 11/1996 | Wu .......................... B62B 1/06 |
| | | | | 248/230.8 |
| 6,109,577 | A | * | 8/2000 | Dziedzic ................... G09F 7/18 |
| | | | | 248/230.8 |
| 6,330,989 | B1 | * | 12/2001 | Okamoto ................ B62J 11/00 |
| | | | | 24/16 R |
| 7,185,399 | B2 | * | 3/2007 | Logan ..................... F16L 3/233 |
| | | | | 24/16 PB |
| 7,854,414 | B2 | * | 12/2010 | Head ...................... F16L 3/233 |
| | | | | 24/20 R |
| 8,439,060 | B1 | * | 5/2013 | Jackson .................. F16L 41/12 |
| | | | | 137/1 |
| 2003/0028148 | A1 | | 2/2003 | Hampton et al. |
| 2005/0279893 | A1 | * | 12/2005 | Rapp ....................... F16L 3/133 |
| | | | | 248/74.3 |
| 2008/0201915 | A1 | | 8/2008 | Obiols et al. |
| 2009/0241300 | A1 | | 10/2009 | Ferguson |
| 2010/0146742 | A1 | * | 6/2010 | Every ................ B65D 63/1063 |
| | | | | 24/16 PB |

\* cited by examiner

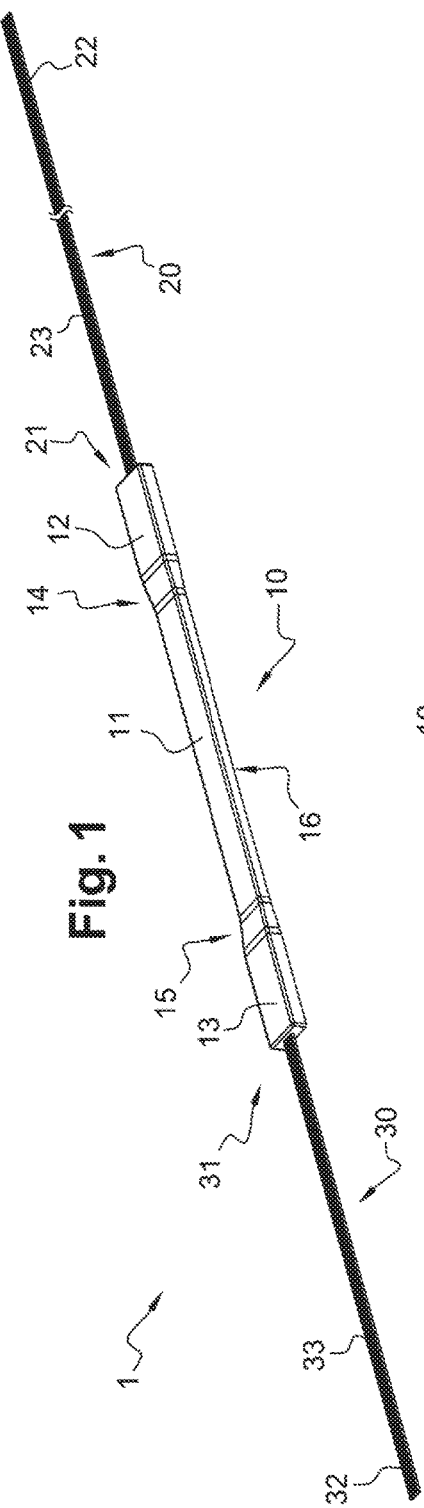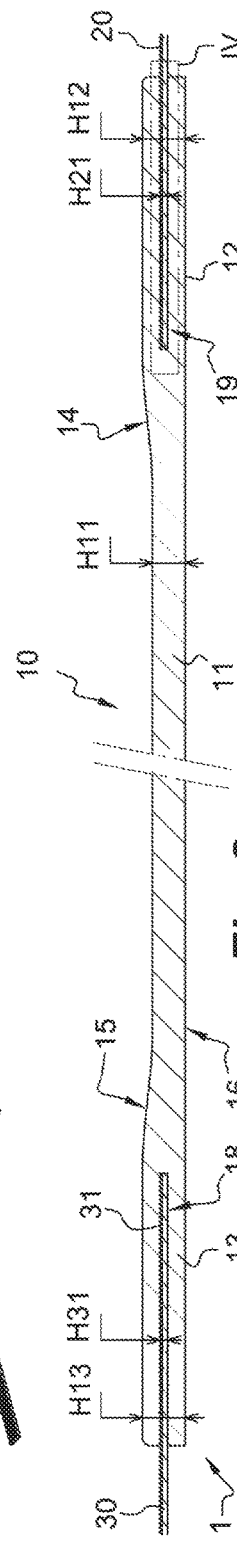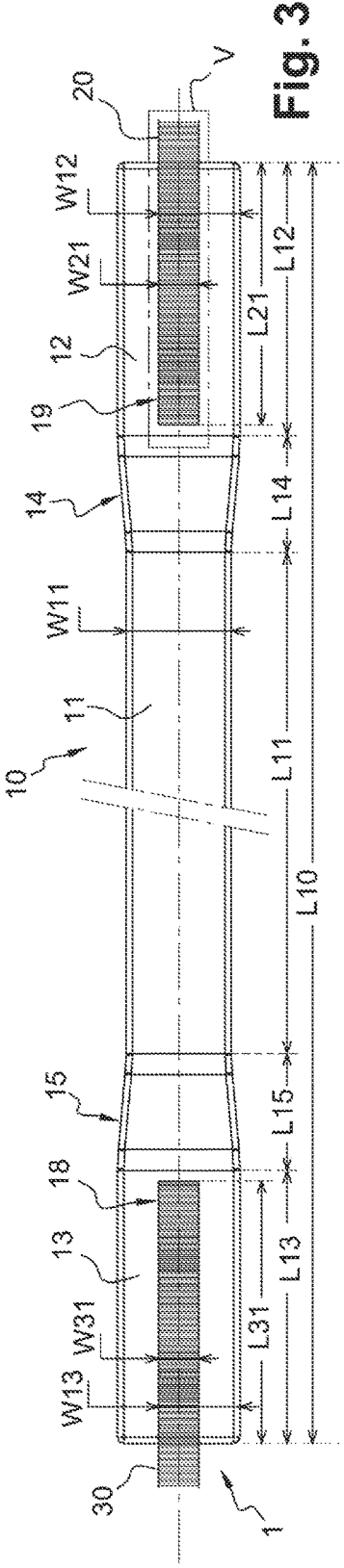

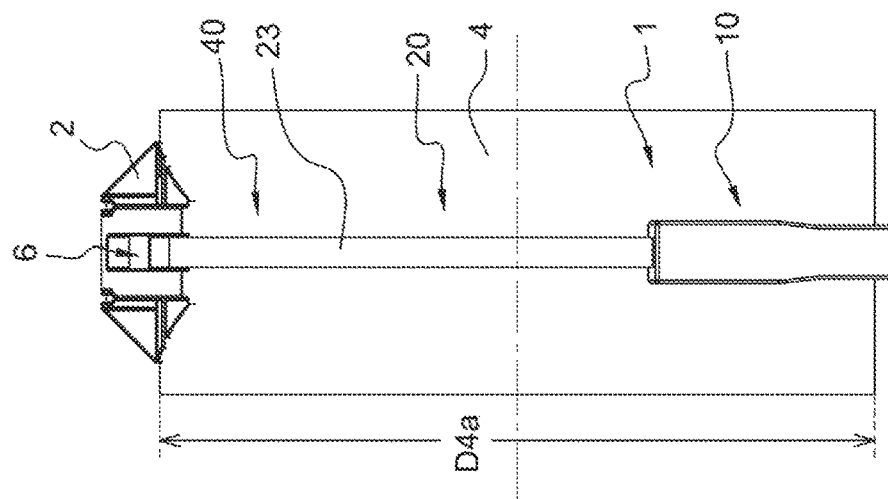
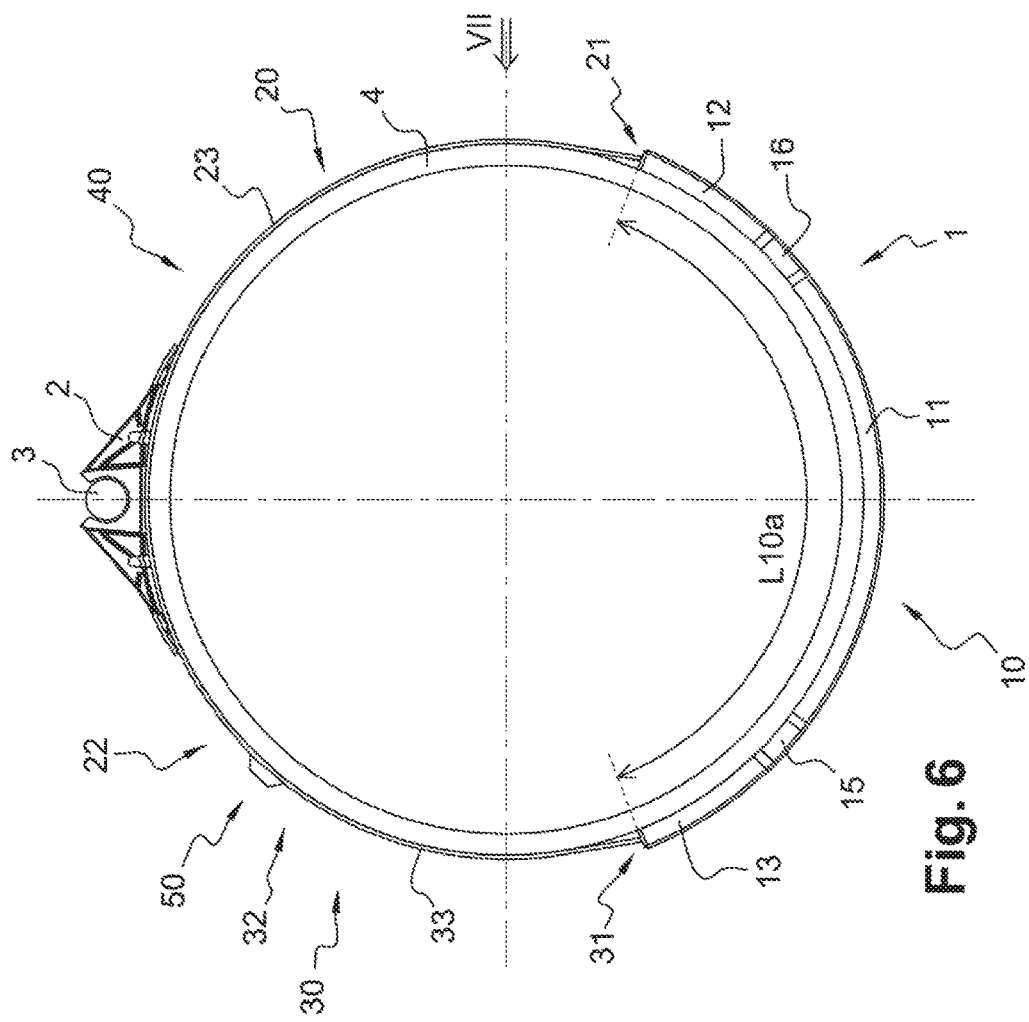

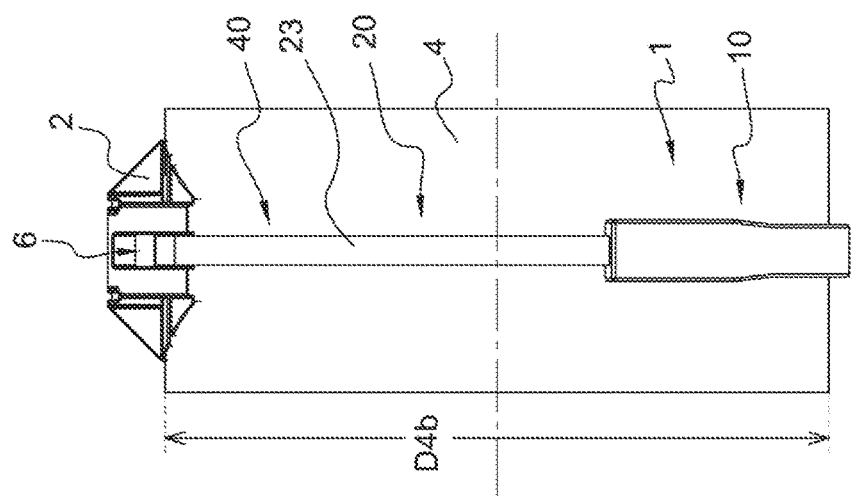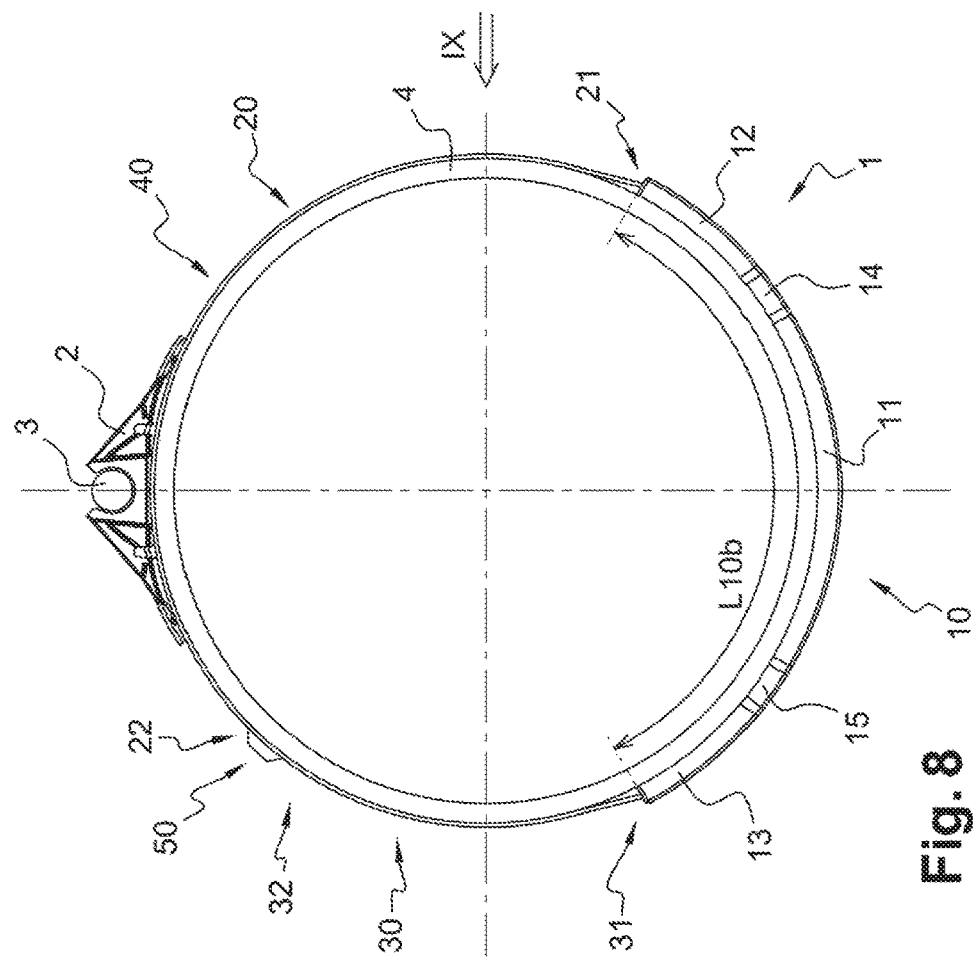

DEVICE FOR SECURING AN ELEMENT ON A PIPE, ASSEMBLY, INSTALLATION AND IMPLEMENTATION METHOD

RELATED APPLICATION

This application claims the benefit of priority of French Patent Application No. 1661376 filed on Nov. 23, 2016, the contents of which are incorporated herein by reference in their entirety.

FIELD AND BACKGROUND OF THE INVENTION

The present invention relates to a device for securing an element on a pipe. The invention also relates to an assembly comprising such a device, and an installation comprising such an assembly. The invention also relates to a method for implementing such a device.

The invention relates to the field of pipes, such as underwater pipelines for transporting hydrocarbons.

In this field, it is known to fasten various elements along pipes, which may extend over several hundreds of kilometers, on land, underground and/or underwater. As non-limiting examples, these elements may be electrical cables, sensor systems, or supports for fastening cables. Regarding this last example, it is in fact preferable to insert a support element between the pipe and the cables.

In practice, the element secured on the pipe must remain in place throughout the entire lifetime of this pipe, for example 25 years. The elements submerged at a depth must withstand the pressures, temperature variations, currents, marine fauna and flora, etc.

Furthermore, it is remarkable that the submerged pipe gradually shrinks over time under the effect of the stresses to which it is subjected, i.e., its diameter gradually shrinks. If an element is secured on the pipe using a tensioned strap, then the tension in the strap relaxes when the pipe shrinks, such that the element is no longer kept in place.

Document FR 2,965,252 describes an example securing system, designed to fasten a load on a transport vehicle. This system comprises a woven strap and a tension loss compensating device. However, this system has a complex construction and is not suitable for securing an element on a submerged or buried pipe.

SUMMARY OF THE INVENTION

The aim of the present invention is to propose a device for resolving the above drawbacks.

To that end, the subject of the invention is a device for securing an element on a pipe, the device comprising:
 a compensating member made from an elastic material, and
 two strands that each extend between a first end secured to the compensating member and a second free end;
where the strands are able, by junction of the second ends, to form a strap provided to secure the element to the pipe; and
where the compensating member is, on the one hand, stretchable when the device is tightened around the pipe, and on the other hand, shrinkable gradually over time to keep the strap taut when the pipe shrinks.

Thus, the invention enables to compensate for the loss of tension in the strap due to the shrinkage of the pipe, and to keep the element secured on the pipe. The compensating member enables to provide flexibility and elasticity to the securing device, compared to a device made up of only of a rigid strap.

According to other advantageous characteristics of the invention, taken in isolation or in combination:
 The device has no metal part.
 The device comprises a junction system for the distal ends of the strands to form the strap provided to secure the element to the pipe.
 The first ends include recesses receiving material of the compensating member during overmolding.
 The recesses comprise hollows formed alternating between slots.
 The recesses comprise through orifices between two opposite surfaces of the first ends.
 The compensating member comprises a median portion and two end portions receiving the first ends of the strands, the end portions having cross-sections larger than the cross-section of the median portion.
 The compensating member comprises intermediate portions having cross-sections varying gradually between the median portion and the end portions.
 The compensating member is made from polyurethane.
 The two strands are made from an inelastic material (i.e., a material that is not stretchable) under normal temperature and pressure conditions (NTPC).

The subject of the invention is also an assembly comprising: a device as described above, and an element intended to be secured to a pipe by implementing the device.

The subject of the invention is also an installation comprising: at least one assembly as described above, at least one part fastened to the element, and a pipe bearing the assembly and the part.

The subject of the invention is also a method for implementing a device as described above. The method is characterized in that it comprises the following steps:
a) when the device is tightened around a pipe, the compensating member is stretched under the effect of the traction exerted by the strap; then
b) when the pipe gradually shrinks over time, the compensating member also shrinks such that the strap is kept taut.

According to a specific embodiment, the pipe is intended to be submerged. The compensating member can gradually shrink over time to keep the strap taut when the pipe shrinks while submerged.

In this case, the assembly is a submersible assembly, comprising a device as described above, and an element intended to be secured to a pipe by implementing the device. The installation in turn comprises at least one submersible assembly as described above, at least one part fastened to the element, and a pipe bearing the submersible assembly and the part.

According to another specific embodiment, the pipe is intended to be buried. The compensating member can gradually shrink over time to keep the strap taut when the pipe shrinks underground.

BRIEF DESCRIPTION OF THE SEVERAL VIEWS OF THE DRAWINGS

The invention will be better understood upon reading the following description, given solely as a non-limiting example, and made with reference to the accompanying figures wherein:

FIG. 1 is a perspective view of a securing device according to the invention;

FIG. 2 is a partial longitudinal sectional view of the device of FIG. 1;

FIG. 3 is a partial top view, enlarged and partially transparent, of the device of FIG. 1;

FIG. 6 is a front view of an installation comprising a securing device according to the invention, a cylindrical pipe, a support element secured to the pipe by using the device, and a cable fastened to the support element;

FIG. 7 is a side view along arrow VII from FIG. 6;

FIG. 8 is a view similar to that of FIG. 6, showing the pipe and the securing device shrunk after several years of use; and FIG. 9 is a side view along arrow IX from FIG. 8.

DESCRIPTION OF SPECIFIC EMBODIMENTS OF THE INVENTION

Figure 4:
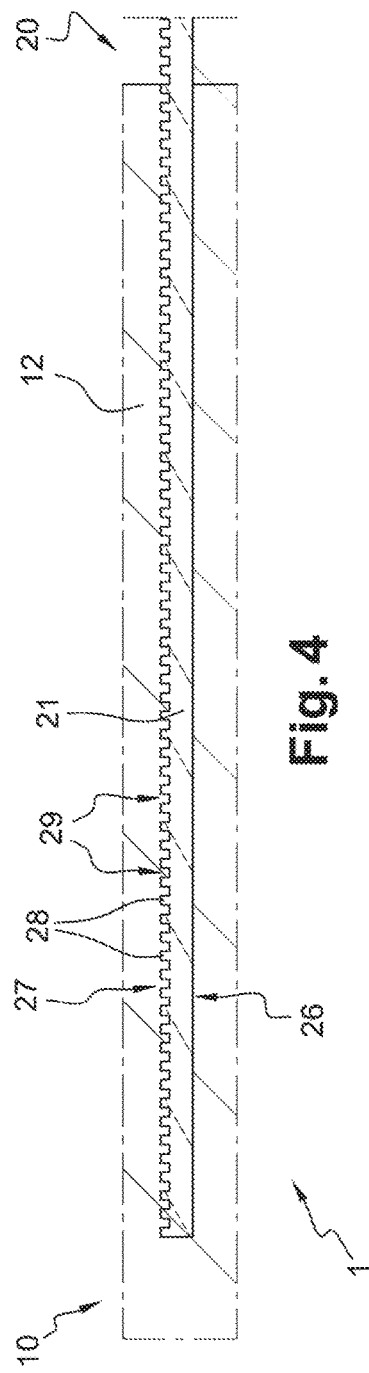
FIG. 4 is a larger scale view of the detail IV in FIG. 2.

FIGS. 1 to 9 show a securing device 1 according to the invention. The device 1 comprises a compensating member 10, as well as two strands 20 and 30 able to form a strap 40.

In FIGS. 1 to 5, the device 1 is shown idle, with no mechanical stresses exerted on its component elements.

In FIGS. 6 to 9, the device 1 is shown during use, in the context of securing of a cable 3 support element 2 on a pipe 4. Alternatively, the element 2 can support several cables 3. According to another alternative, the element 2 can be of any other type suitable for the targeted application. Furthermore, instead of a cable 3, the element 2 can receive any other type of part, generally elongated, such as a sheath or a hose.

The element 2 is in a single piece, formed from a single piece of plastic. Preferably, the member 10 is a polyurethane elastomer, as known under the brand COURBHANE by the Applicant. The element 2 is secured on the pipe 4 using the device 1, in particular owing to the passage of the strap 40 through an opening 6 arranged to that end in the element 2.

The cable 3 can be a power cable or a digital data transfer cable.

The pipe 4 is a metal tube, preferably covered with an insulating layer, for example made from polypropylene.

The member 10 is in a single piece, formed from a single piece of plastic. Preferably, the member 10 is made from polyurethane.

The member 10 comprises a median portion 11, two end portions 12 and 13, and two intermediate portions 14 and 15 formed between the median portion 11 and the end portions 12 and 13, respectively. The member 10 includes a lower surface 16 that extends over its entire length and is intended to come to bear against the outer surface of the pipe 4.

When idle, the member 10 has a length L10. The portion 11 has a length L11, a width W11 and a height H11. The portion 12 has a length L12, a width W12 and a height H12. The portion 13 has a length L13, a width W13 and a height H13. The portion 14 has a length L14, a width variable between the widths W11 and W12, and a height variable between the heights H11 and H12. The portion 15 has a length L15, a width variable between the widths W11 and W13, and a height variable between the heights H11 and H13.

Preferably, the member 10 is symmetrical relative to a transverse central plane. Thus, the portion 12 has dimensions L12, W12 and H12 identical to the dimensions L13, W13 and H13 of the portion 13, and the portion 14 has dimensions L14, W14 and H14 identical to the dimensions L15, W15 and H15 of the portion 15.

The length L11 is greater than the lengths L12 and L13, which in turn are greater than the lengths L14 and L15. The width W11 is smaller than the widths W12 and W13. Likewise, the height H11 is smaller than the heights H12 and H13. Consequently, the portions 12 and 13 have cross-sections larger than the cross-section of the portion 11. The portions 14 and 15 in turn have cross-sections varying gradually between the portion 11 and the portions 12 and 13. The shapes of all of the cross-sections of the portions 11-15 are parallelepipeds.

Due to its smaller dimensions, and therefore its lower mechanical strength, it is primarily the portion 11 that is stretched when the member 10 is subject to tensile stresses on its two end portions 12 and 13.

Each strand 20 and 30 is one unit, made from a single piece. The strands 20 and 30 are made from a rigid, inelastic material under normal temperature and pressure conditions (NTPC). The material of the strands 20 and 30 is chosen based on a compromise between strength and flexibility. The strands 20 and 30 can be made from a plastic, metal, composite or woven material, or any other material suitable for the targeted application.

The strand 20 extends between two ends 21 and 22 connected by a running part 23. Likewise, the strand 30 extends between two ends 31 and 32 connected by a running part 33. The ends 21 and 31 are secured to the member 10, more specifically the portions 12 and 13, respectively. The ends 22 and 32 are initially free, and intended to be joined firmly using the junction system 50, such that the strands 20 and 30 form the strap 40.

Figure 5:
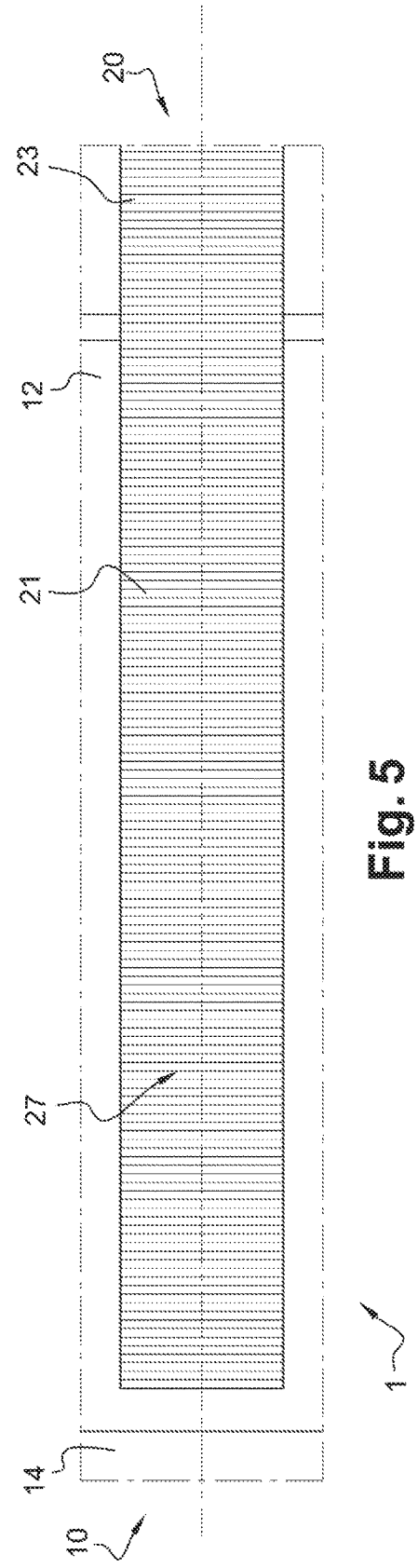
FIG. 5 is a larger scale view of the detail V in FIG. 3.

Preferably, the ends 21 and 31 are secured to the portions 12 and 13 by overmolding. In other words, the member 10 is overmolded on the ends 21 and 31 of the strands 20 and 30. As shown in FIGS. 4 and 5 for the strand 20, the end 21 includes a smooth surface 26 and a slotted surface 27. The surface 27 includes a relief made up of alternating protruding slots 28 and hollow recesses 29 between the slots 28. The recesses 29 receive the material of the member 10 during overmolding, which enable to create a rigid link between the member 10 and the strand 20. The explanations provided above for the end 21 are also valid for the end 31.

Alternatively, the ends 21 and 31 may include other means for securing to the member 10. For example, the ends 21 and 31 can be provided with through orifices between the faces 26 and 27, which can be smooth or raised. The material of the member 10 is then received in these orifices during overmolding. Other securing means can be implemented without departing from the scope of the invention.

The end 21 housed in the portion 12 has a length L21, a width W21 and a height H21. Likewise, the end 31 housed in the portion 13 has a length L31, a width W31 and a height W31. Preferably, each strand 20 and 30 has uniform dimensions over its entire length, from the ends 21 and 31 to the ends 22 and 32. Still more preferably, the dimensions L21, W21 and H21 are equal to the dimensions L31, W31 and H31.

Preferably, the length L21 is greater than 90% of the length L12, the width W21 is comprised between 20 and 40% of the width W12, and the height H21 is comprised between 10 and 20% of the height H12. The same is true for the portion 13 and the end 31.

In practice, when the device 1 is positioned around the pipe 4, the strands 20 and 30 are distinct and the strand 20 is passed through the opening 6 formed in the element 2.

As shown in FIGS. 6 and 7, the strands 20 and 30 are then secured at their ends 22 and 32 using the system 50, with which the strap 40 can be formed around the pipe 4. Initially, the pipe 4 has a diameter D4a. The strands 20 and 30 are next tightened near the system 50, so as to clamp the strap 40 around the pipe 4, and thus to flatten the element 2 against the pipe 4. The tensile stresses exerted by the strands 20 and 30 on the portions 12 and 13 cause the elongation of the member 10. At this stage, the member 10 has a length L10a greater than its length L10 at rest.

As shown in FIGS. 8 and 9, the pipe 4 gradually shrinks over time, such that its diameter D4a decreases to a diameter D4b. As an example, after 25 years submerged, the diameter D4b may reach 90% of the diameter D4a. Due to its elasticity properties, the member 10 gradually shrinks while accompanying the shrinkage of the pipe 4. Thus, the strap 40 remains taut, and the element 2 remains flattened against the pipe 4. The member 10 then has a length L10b smaller than its initial length L10a, but greater than its length L10 at rest.

Thus, the invention enables to compensate for the loss of tension in the strap 40 due to the shrinkage of the pipe 4, and to keep the element 2 secured on the pipe 4. The compensating member 10 enables to provide flexibility and elasticity to the securing device 1, compared with a device made up only of a rigid strap.

Furthermore, the device 1 and the assembly 1+2 can be configured differently from FIGS. 1 to 9 without going beyond the scope of the invention. Moreover, the technical characteristics of the various embodiments mentioned above can, as a whole or in part, be combined with each other. Thus, the device 1 may be adapted in terms of cost, functionalities and performance.

What is claimed is:

1. Device for securing an element on a pipe, the device comprising:
   a compensating member made from an elastic material, and
   two strands that each extend between a first end secured to the compensating member and a second free end;
   wherein the compensating member is overmolded on the first ends of the strands, and wherein the first ends include recesses receiving material of the compensating member during overmolding, such that a rigid link is formed between the compensating member and the first ends of the strands, and the strands are fixed and immovable relative to the compensating member;
   where the strands are able, by junction of the second ends, to form a strap provided to secure the element to the pipe; and
   where the compensating member is, on the one hand, stretchable when the device is tightened around the pipe, and on the other hand, shrinkable gradually over time to keep the strap taut when the pipe shrinks.

2. Device according to claim 1, characterized in that the recesses comprise hollows formed in between alternating protruding slots.

3. Device according to claim 2, wherein first ends comprise a smooth surface and a slotted surface, and the recesses and alternating protruding slots are arranged longitudinally along the slotted surface.

4. Device according to claim 1, characterized in that the recesses comprise through orifices between two opposite surfaces of the first ends.

5. Device according to claim 1, characterized in that the compensating member comprises a median portion and two end portions receiving the first ends of the strands, the end portions having cross-sections larger than the cross-section of the median portion.

6. Device according to claim 1, characterized in that the compensating member comprises intermediate portions having cross-sections varying gradually between the median portion and the end portions.

7. Device according to claim 1, characterized in that the compensating member is made from polyurethane.

8. Device according to claim 1, wherein the device is configured within an assembly, the assembly comprising:
   the device, and
   an element provided to be secured to a pipe by using the device.

9. Device according to claim 1, wherein the device is configured within an installation, the installation comprising:
   at least one assembly according to claim 8,
   at least one part fastened to the element, and
   a pipe supporting the assembly and the part.

10. Device according to claim 1, wherein the compensating member is formed of a single integral piece.

11. Device according to claim 10, wherein the single integral piece is formed of plastic.

12. Device according to claim 1, wherein, when the compensating member shrinks gradually over time, the strands remain in a fixed position relative to the compensating member.

13. A method for securing an element to a pipe, comprising:
   a) tightening a device around the pipe, the device comprising:
      a compensating member made from an elastic material, and
      two strands that each extend between a first end secured to the compensating member and a second free end;
      wherein the compensating member is overmolded on the first ends of the strands, and wherein the first ends include recesses receiving material of the compensating member during overmolding;
      where the strands are able, by junction of the second ends, to form a strap provided to secure the element to the pipe; and
      where the compensating member is, on the one hand, stretchable when the device is tightened around the pipe, and on the other hand, shrinkable gradually over time to keep the strap taut when the pipe shrinks;
   b) during the tightening step, sufficiently stretching the compensating member under the effect of the traction exerted by the strap such that, when the pipe gradually shrinks over time, the compensating member also shrinks such that the strap is kept taut.

14. Device for securing an element on a pipe, the device comprising:
   a compensating member made from an elastic material, and
   two strands that each extend between a first end secured to the compensating member and a second free end, wherein the compensating member is overmolded on the first ends of the strands, such that a rigid link is formed between the compensating member and the first ends of the strands, and the strands are fixed and immovable relative to the compensating member;
   where the strands are able, by junction of the second ends, to form a strap provided to secure the element to the pipe; and
   where the compensating member is, on the one hand, stretchable when the device is tightened around the pipe, and on the other hand, shrinkable gradually over time to keep the strap taut when the pipe shrinks.

15. Device according to claim 14, wherein, when the compensating member shrinks gradually over time, the strands remain in a fixed position relative to the compensating member.

* * * * *